US007459886B1

(12) United States Patent
Potanin et al.

(10) Patent No.: US 7,459,886 B1
(45) Date of Patent: Dec. 2, 2008

(54) COMBINED LDO REGULATOR AND BATTERY CHARGER

(75) Inventors: Vladislav Potanin, San Jose, CA (US); Elena Potanina, San Jose, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 307 days.

(21) Appl. No.: 10/850,943

(22) Filed: May 21, 2004

(51) Int. Cl.
*H02J 7/00* (2006.01)
*G01R 1/20* (2006.01)

(52) U.S. Cl. ........................ 320/135; 324/416; 323/371

(58) Field of Classification Search ................. 320/135; 324/416, 413; 323/371; 439/894
See application file for complete search history.

(56) References Cited

U.S. PATENT DOCUMENTS

| | | | | |
|---|---|---|---|---|
| 5,420,493 | A | 5/1995 | Hargadon et al. | |
| 5,994,876 | A * | 11/1999 | Canny et al. | 320/132 |
| 6,118,255 | A * | 9/2000 | Nagai et al. | 320/152 |
| 6,188,211 | B1 * | 2/2001 | Rincon-Mora et al. | 323/280 |
| 6,366,053 | B1 * | 4/2002 | Belehradek | 320/128 |
| 2002/0125866 | A1 * | 9/2002 | Hamon et al. | 323/280 |
| 2003/0054703 | A1 * | 3/2003 | Fischer et al. | 439/894 |

OTHER PUBLICATIONS

Maxim Integrated Products. "*Linear Li+ Battery Charger with Integrated Pass FET, Thermal Regulation, and ACOK in 3mmx3mm TDFN.*" Oct. 2003. 11pp.

"Analog Devices: GSM Power Management System ADP3408," Rev. A. 20pp.

"Analog Devices: Lithium-Ion Battery Charger ADP3820," Rev. A. 8pp.

Leung, Ka Nang and Philip K. T. Mok. Oct. 2003. "A Capacitor-Free CMOS Low-Dropout Regulator with Damping-Factor-Control Frequency Compensation." *IEEE Journal of Solid-State Circuits*. 38:10, 1691-1702.

* cited by examiner

*Primary Examiner*—Gary L Laxton
*Assistant Examiner*—Yalkew Fantu
(74) *Attorney, Agent, or Firm*—Darby & Darby P.C.; John Tolomei

(57) ABSTRACT

A method and circuit for simultaneously charging a battery and providing supply voltage to a load. The circuit includes a low-drop-out voltage (LDO) regulator and a constant-current, constant-voltage (CC-CV) regulator. In one embodiment, CC-CV regulator provides a control voltage to the LDO regulator generated by a voltage-controlled current source. As charge voltage approaches battery termination voltage, the control voltage is reduced regulating LDO regulator output to provide constant voltage while decreasing charge current to the battery. In another embodiment, a slow response amplifier and a current mirror in the CC-CV regulator provide a smooth and stable charging current to the battery that is decreased as battery charge approaches a full charge level, while maintaining constant supply voltage to the load. In a further embodiment, an externally programmable amplifier in the CC-CV regulator may enable use of the circuit with varying power sources.

24 Claims, 3 Drawing Sheets

COMBINED LDO REGULATOR AND BATTERY CHARGER

FIELD OF THE INVENTION

The present invention relates to battery charging, and, in particular, to a circuit and method for low-drop-out (LDO) voltage regulator and battery charger circuit.

BACKGROUND

Some commonly available battery chargers for portable devices such as cellular phones, personal digital assistants (PDAs), and the like, include a dual mode operation, where the charger may provide a voltage source for a load (cellular phone, PDA, and the like) or charge the battery. Conventional linear battery chargers typically provide continuous stable current to both battery and load. Such battery chargers typically include a switch controlled by an external signal for switching between supplying the load and charging the battery.

A common problem with these battery chargers is that the load may be subjected to excess current and damaged, if the battery is inadvertently disconnected while being charged. This problem may be an issue not only during operation, but also during production testing, when batteries may be inserted and removed for the first time.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, or an embodiment combining software and hardware aspects. The following detailed description is, therefore, not to be taken in a limiting sense.

Briefly stated, the present invention is related to a low-drop-out (LDO) voltage regulator and battery charger circuit that does not need an external control to switch between two modes, and may provide load supply and battery charge current simultaneously, if power is available. When a battery is being charged, the circuit is in constant current mode (CC), and provides a constant charging current to the battery. When the battery is close to a full charge status, the charging current is gradually reduced, while a charge voltage supplied to the battery remains constant. This mode of operation is called constant voltage (CV) mode. When the battery is fully charged, the circuit may continue to remain in the CV mode providing constant charge voltage to the battery. In either mode, a current provided to a load is maintained substantially constant. Accordingly, the circuit is configured to provide a stable voltage to the load regardless of a battery charging status, and a stable charging current to the battery regardless of a load drain.

Figure 1:
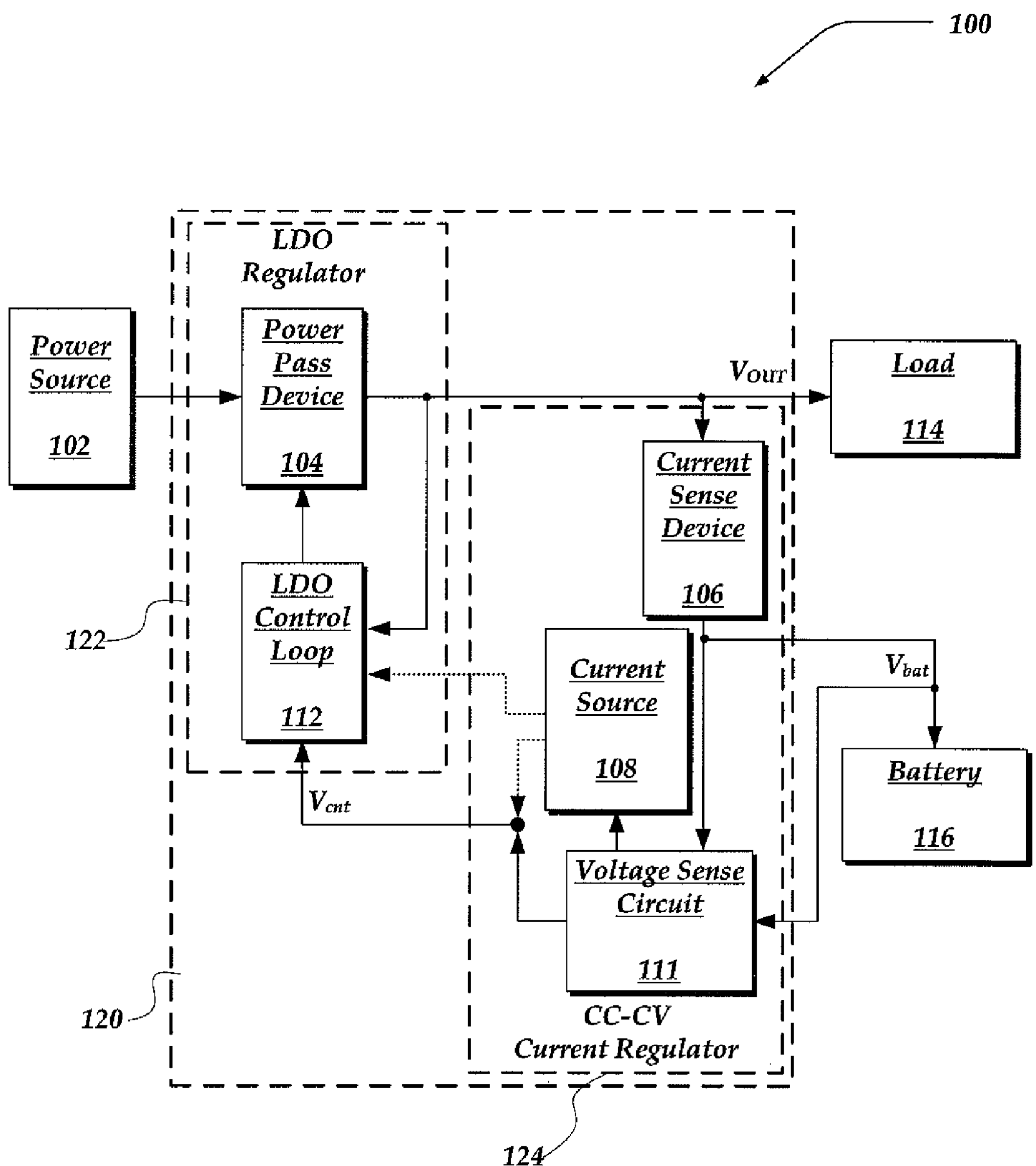
FIG. 1 illustrates a block diagram of an embodiment of a combined low-drop-out (LDO) voltage regulator and battery charger circuit with external devices employing the circuit.

FIG. 1 illustrates block diagram 100 of an embodiment of a combined LDO regulator and battery charger circuit with external devices employing the circuit. External devices include power source 102, load 114, and battery 116. Circuit 120 includes two main subs-circuits: LDO regulator 122 and constant-current constant-voltage (CC-CV) current regulator 124. Voltage regulator 122 further includes power pass device device 104 and LDO control loop 112. Current regulator 124 further includes current sense device 106, current sense integrator 108, voltage sense circuit 111. FIG. 1 shows a particular arrangement of inputs and outputs of the various components. In one embodiment, all of the components of circuit 120 are included in the same chip. Alternatively, one or more of the components of circuit 120 may be off-chip.

LDO regulator is arranged to receive an unregulated input from external power source 102, and to provide a regulated output voltage to load 114 in response to control voltage $V_{cnt}$ and the regulated output voltage. CC-CV current regulator 124 is configured to sense a load current and to provide a battery charge voltage $V_{bat}$ to battery 116. CC-CV current regulator 124 is further configured to provide control voltage $V_{cnt}$ to LDO regulator 122 such that the battery charging current is maintained constant in a constant current mode and reduced in response to a battery charge status during a constant voltage mode. In one embodiment, CC-CV current regulator 124 may also provide a portion of feedback voltage $V_{fb}$.

Power pass device 104 may be configured to regulate the unregulated input received from power source 102. LDO loop control 112 is arranged to receive a control voltage $V_{cnt}$ from CC-CV regulator 124 and provide a control signal to power pass device 104. Current sense device 106 may include a current sense resistor $R_{sense}$ that has low resistance. The resistance of $R_{sense}$ may range from about 10 milliohms to about 100 milliohms. This may enable circuit 120 to provide the output voltage to load 114 simultaneously with charge current to battery 116. Current sense integrator 108 may provide an output current in response to an output of voltage sense circuit 111. Voltage sense circuit 111 is arranged to receive battery charge voltage $V_{bat}$. In a further embodiment, voltage sense circuit 111 may be configured to limit battery charge voltage $V_{bat}$.

In one embodiment, control voltage $V_{cnt}$ may be an output of voltage sense circuit 111 that comprises a portion of battery charge voltage $V_{bat}$ derived from a voltage divider. In another embodiment, $V_{cnt}$ may comprise a combination of an output of current sense integrator 108 and an output of voltage sense circuit 111 as described above. In either case, control voltage $V_{cnt}$ for LDO control loop 112 in an active linear regulation mode may be expressed as:

$$V_{cnt}=V_{bat}+(I_{chg}*R_{sense}-(V_{bat}-V_{term})*G),$$

where $I_{chg}$ is the battery charging current, $V_{term}$ is a termination voltage for the battery indicating an upper limit for battery charge voltage, and G is a gain of voltage sense integrator included in voltage sense circuit 111.

The above described elements provide circuit 120 with a CC-CV charging profile. The use of $V_{cnt}$, generated by the charge current regulation sub-circuit, as control voltage for voltage regulator 122 instead of a constant reference voltage, enables circuit 120 to simultaneously provide load supply and battery charging without risking damage to load 114 when battery 116 is disconnected.

Figure 2:
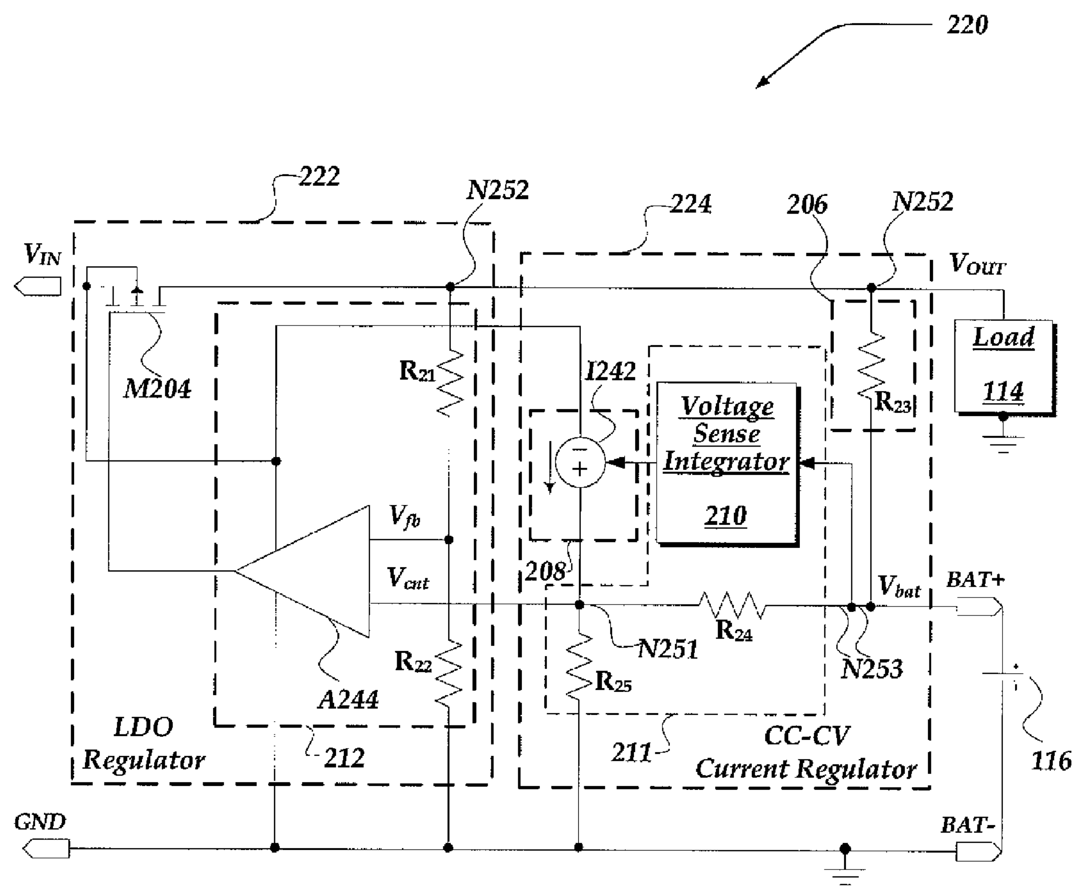
FIG. 2 schematically illustrates an embodiment of the LDO regulator and battery charger circuit of FIG. 1.

FIG. 2 schematically illustrates one embodiment of combined LDO regulator and battery charger circuit 220, load 114, and battery 116. Circuit 220 may be an exemplary embodiment of circuit 120 of FIG. 1. Circuit 220 includes LDO regulator 222 and CC-CV current regulator 224.

LDO regulator 222 is arranged to provide a regulated output voltage based on an unregulated input. In one embodiment, LDO regulator 222 includes power transistor M204 and LDO control loop 212. LDO control loop 212 includes amplifier A244, and resistors $R_{21}$ and $R_{22}$. Power transistor M204 is arranged to receive an analog signal VrN at the source of power transistor M204. Power transistor M204 is further arranged to provide a regulated output voltage $V_{OUT}$ to load 114 at node N252. Amplifier A244 is arranged to provide a control signal to a gate of power transistor M204. A feedback loop provides feed back voltage $V_{fb}$ to an input of amplifier A244 from a drain of power transistor M204 through a first voltage divider. The first voltage divider includes resistors $R_{21}$ and $R_{22}$.

CC-CV current regulator 224 is configured to provide a charging current to battery 116 and to provide control voltage $V_{cnt}$ to LDO regulator 222 based on a sensed and amplified load current and battery charge voltage. In one embodiment, CC-CV current regulator 224 includes voltage sense circuit 211, current sense integrator 208, and current sense device 206. Current sense device 206 may include sense resistor $R_{23}$ and current sense integrator 208 may include voltage-controlled current source I242. Voltage sense circuit 211 may include voltage sense integrator 210 and a second voltage divider comprising resistors $R_{24}$ and $R_{25}$.

Control voltage $V_{cnt}$ may be derived from a current provided by voltage-controlled current source I242. Voltage sense integrator 210 is configured to receive a battery charge voltage $V_{bat}$ and provide a control signal to voltage-controlled current source I242 based on battery charge voltage $V_{bat}$. Current sense resistor $R_{23}$ is arranged to sense a load current. A voltage derived from the sensed load current and battery charge voltage $V_{bat}$ may be provided through a second voltage divider to an input of amplifier A244 along with an output of the voltage-controlled current source I242 at node N251. The second voltage divider includes resistors $R_{24}$ and $R_{25}$.

In constant current mode, I242 is configured to supply a constant current. In constant voltage mode, I242's output may be reduced by voltage sense integrator 210, if battery charge voltage $V_{bat}$ approaches battery limit voltage $V_{term}$. Battery charge current, $I_{chg}$, flowing through node N253 between $R_{24}$ and battery terminal BAT+, to battery 116 may be expressed as:

$$I_{chg} = \frac{V_{OUT} - V_{bat}}{R_{23}},$$

where $V_{OUT}$ is an output of LDO regulator 222, and may be expressed as:

$$V_{OUT} = V_{cnt} * \frac{R_{21} + R_{22}}{R_{22}},$$

and

LDO regulator 222 reference voltage $V_{cnt}$ may be expressed as:

$$V_{cnt} = \frac{(V_{bat} + I_{242} * R_{24}) * R_{25}}{(R_{24} + R_{25})},$$

where $I_{242}$ is the current supplied by the current source I242.

In one embodiment, resistor values may be selected such that $$\frac{R_{21}}{R_{22}} = \frac{R_{24}}{R_{25}}.$$

In that case, the charge current, $I_{chg}$, may be expressed as:

$$I_{chg} = I_{242} * \frac{R_{24}}{R_{23}}.$$

A ratio of the resistors $R_{21}$, $R_{22}$, $R_{23}$, $R_{24}$, and $R_{25}$ creates biasing for LDO regulator 222 to regulate $V_{OUT}$ such that $V_{OUT}$ is slightly higher than battery charge voltage $V_{bat}$, enabling a supply of stable voltage to load 114 and current to battery 116. The difference between $V_{OUT}$ and $V_{bat}$ is determined by current source I242 and the ratio of the resistors. In other words, resistors $R_{24}$ and $R_{25}$ provide another feedback path for stability to LDO regulator 222.

In constant current mode, voltage sense integrator 210 and current source I242 may operate in such a way that, an average charge current, I242, may be constant and expressed as:

$$I_{242} = I_{trg} * \frac{R_{23}}{R_{24}},$$

where $I_{trg}$ is a target full charge current for battery 116.

As mentioned above, when battery charge voltage, $V_{bat}$, reaches about termination voltage $V_{term}$, the circuit may begin to operate in constant voltage mode and the current supplied by voltage-controlled current source I242 may decrease. If battery 116 is disconnected while being charged, current flow through $R_{23}$ may terminate, causing battery charge voltage $V_{bat}$ to approximate about $V_{OUT}$. Since current source I242 is configured to continue supplying the current, $V_{OUT}$ may increase up to $V_{IN}$, but not beyond, protecting load 114. If a partially charged battery is connected to the circuit while only load 114 is being supplied, a current through $R_{23}$ would be added, causing $V_{OUT}$ to decrease. However, the feedback path provided by $R_{24}$ and $R_{25}$ may control LDO regulator 222 to regulate $V_{OUT}$ back to a value slightly higher than $V_{bat}$.

In another embodiment, current source I242 may be configured such that a limit voltage for $V_{OUT}$ has a smaller value than $V_{IN}$. A power dissipation characteristic and temperature dependency of resistors $R_{23}$, $R_{24}$, and $R_{25}$ may affect accuracy and stability of current and voltage regulation of the circuit. In a further embodiment, current source I242 may be configured to have a temperature dependent characteristic such that an inaccuracy caused by resistors $R_{23}$, $R_{24}$, and $R_{25}$ may be compensated.

Figure 3:
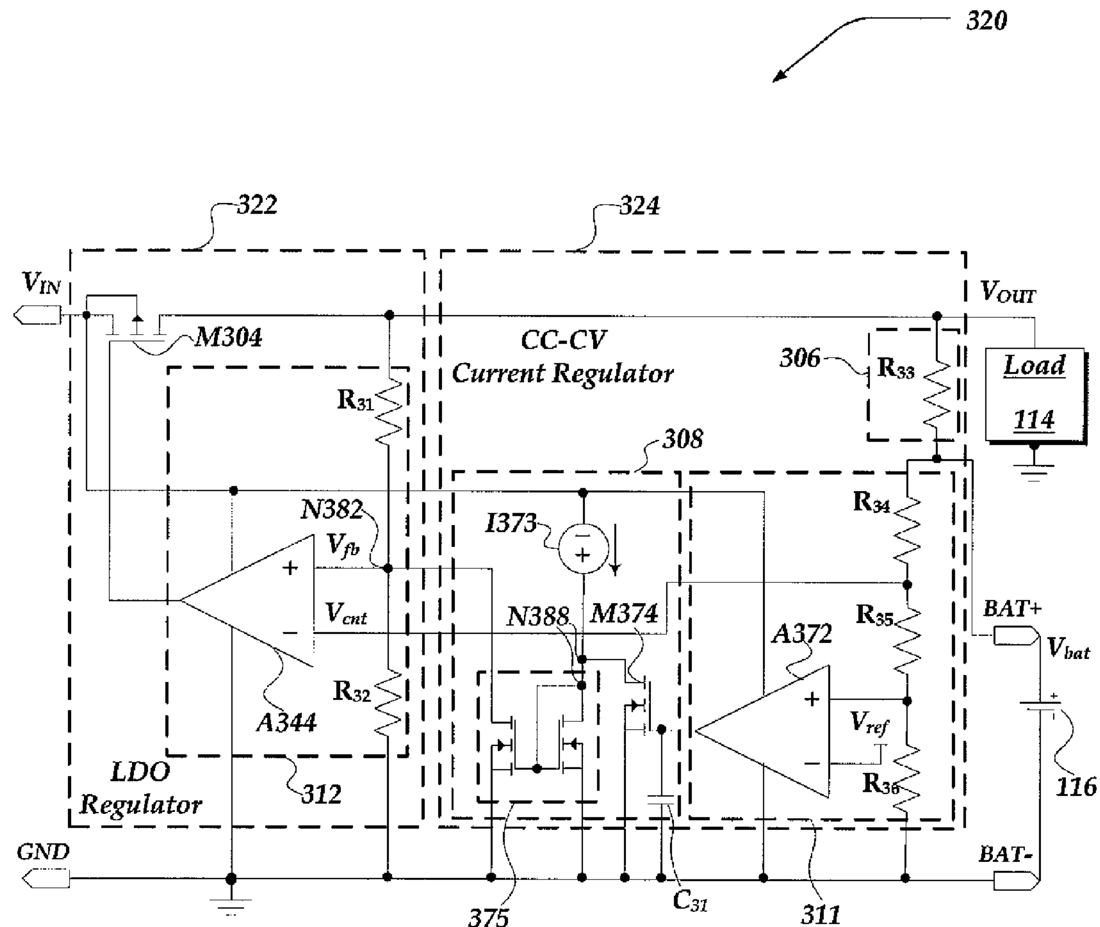
FIG. 3 schematically illustrates another embodiment of the LDO regulator and battery charger circuit of FIG. 1.

FIG. 3 schematically illustrates one embodiment of combined LDO regulator and battery charger circuit 320, load 114, and battery 116. Circuit 320 may be another exemplary embodiment of circuit 120 of FIG. 1. Circuit 320 includes LDO regulator 322 and CC-CV current regulator 324.

LDO regulator 322 operates substantially the same as described in conjunction with FIG. 2 and may include power transistor M304 and LDO control loop 312. LDO control loop 312 may include amplifier A344 and a first voltage divider comprising resistors $R_{31}$ and $R_{32}$. One difference between LDO regulator 222 and LDO regulator 322 is node N382 being further coupled to current mirror 375 of CC-CV current regulator 324. This connection provides for further adjustment of feedback voltage $V_{fb}$ based on a current flowing through current mirror 375. Other operational aspects of LDO regulator 322 are substantially the same as LDO regulator 222 of FIG. 2.

CC-CV current regulator 324 is similarly configured to provide a charging current to battery 116 and to provide control voltage $V_{cnt}$ and a portion of feedback voltage $V_{fb}$ to LDO regulator 322. CC-CV current regulator 324 may include voltage sense circuit 311, current sense integrator 308, and current sense device 306. Voltage sense circuit 311 may include amplifier A372 and a second voltage divider comprising resistors $R_{34}$, $R_{35}$, and $R_{36}$. Current sense integrator 308 may include voltage-controlled current source I373, current mirror 375, and transistor M374. Current sense device 306 may comprise current sense resistor $R_{33}$.

In one embodiment, current sense resistor $R_{33}$ may be arranged to sense a load current. Battery charge voltage $V_{bat}$ is sensed by a voltage divider including resistors $R_{34}$, $R_{35}$, and $R_{36}$. Amplifier A372 is arranged to receive a portion of battery charge voltage $V_{bat}$ and amplify a difference between $V_{bat}$ and a predetermined reference voltage $V_{ref}$. Amplifier A372 is further configured to control a gate of transistor M374 of current sense integrator 308. Another portion of the battery charge voltage $V_{bat}$ may be provided to an input of amplifier A344 of LDO regulator 322 as control voltage $V_{cnt}$.

Voltage-controlled current source I373 is configured to provide a current to one source of current mirror 375 and to transistor M374. Transistor M374 is configured to control the current flowing through one source of current mirror 375. Accordingly another current flowing through another source of current mirror 375 may be controlled by transistor M374. By controlling the current through the other source of current mirror 375, a portion of feedback voltage $V_{fb}$ at another input of amplifier A344 may also be controlled.

Current source I373 may be arranged to determine a full rate current setting. If resistors are selected such that:

$$\frac{R_{31}}{R_{32}} = \frac{R_{34}}{(R_{35}+R_{36})},$$

charge current in constant current mode may be expressed as:

$$I_{chg} = I_{373} * \frac{R_{31}}{R_{33}},$$

where I373 is the current supplied by current source I373.

This is similar to the operation of the circuit described in FIG. 2. As can be seen in FIG. 3, however, an additional current may be created in the feedback path for LDO regulator 322 by current mirror 375.

Constant voltage mode may begin when battery 116 is close to being charged such that $V_{bat}$ approximates $V_{term}$, where $V_{term}$ is determined by:

$$V_{term} = V_{ref} * \frac{R_{34}+R_{35}+R_{36}}{R_{36}}.$$

$V_{ref}$ is a predetermined reference voltage. As a result, amplifier A372 may increase a gate voltage of transistor M374 causing transistor M374 to drain some of the current provided by current source I373. This may result in a decrease of a current flowing through the source terminal of current mirror 375 at node N388. As battery 116 further charges, the current flowing through current mirror 375 may continue to decrease. Another result of this decrease is a decrease in the current drawn by the other source of current mirror 375 at node N382 leading to a change in feedback voltage $V_{fb}$. LDO regulator 322 is thereby controlled such that when the current reaches about zero, charging will terminate. Accordingly, as battery 116 gets close to being charged, charge current will decrease, while charge voltage remains constant.

Amplifier A372 may be a slow response, transconductance amplifier with very low output current. This characteristic of amplifier A372 along with capacitor $C_3$, coupled between the output of amplifier A372 and ground, may provide for improved frequency response of CC-CV current regulator 324 and a smooth battery charging current. In typical applications such as cellular phone chargers, load current may change drastically based, in part, on an operation mode. For example, if the cellular phone begins transmitting while being powered by the circuit, load current may increase dramatically. At the same time, a smooth and stable current is preferred for charging the battery. Slow response, transconductance amplifier A372 coupled with capacitor $C_{31}$ may provide such smooth and stable battery charge current despite rapidly changing load current.

In one embodiment, amplifier A372 may be externally programmable to adjust for different power sources. A LDO regulator and battery charger circuit, such as described above, may be employed with a variety of power sources including, but not limited to, AC/DC adapters, Power-over-Ethernet sources, DC/DC adapters, USB ports, and the like. Since each power source may have a different characteristic and tolerance, smoothness and stability of the charging current provided to battery 116 may vary based on the power source. An external programming source may provide amplifier A372 with a control signal enabling amplifier A372 to modify its response characteristics, thereby adjusting battery charge current to varying power sources.

The above specification, examples and data provide a description of the manufacture and use of the composition of the invention. Since many embodiments of the invention can be made without departing from the spirit and scope of the invention, the invention also resides in the claims hereinafter appended.

We claim:

1. A circuit for charging a battery and providing a supply voltage to a load, comprising:

a voltage regulator that is arranged to receive an input power signal from a power source, a feedback signal, and a control signal, wherein the voltage regulator is further arranged to provide a regulated output signal to the load in response to the feedback signal and in response to the control signal, wherein the feedback signal is based, at least in part, on the regulated output signal; and a constant current, constant voltage (CC-CV) current regulator that is arranged to provide a charging signal to the battery, and to provide the control signal to the voltage regulator such that a current of the charging signal is maintained at a substantially constant value during a constant current mode and is reduced in response to a battery charge status during a constant voltage mode, wherein the voltage regulator and the CC-CV current regulator are arranged such that the regulated output signal and the charging signal to the battery are simultaneously provided during the constant current mode, wherein the regulated output signal and the charging signal are separate signals, and wherein the voltage regulator is arranged such that the a voltage of the regulated output signal is maintained at a substantially constant value independent of the value of the current of the charging signal.

2. The circuit of claim 1, wherein the voltage regulator is a low-drop-out (LDO) regulator, comprising:

a power pass device that is arranged to provide the regulated output signal from the input power signal; and an LDO control loop that is arranged to control the power pass device in response to the regulated output signal and in response to the control signal.

3. The circuit of claim 2, wherein the power pass device comprises a power transistor, and wherein the LDO control loop comprises an amplifier and a first voltage divider.

4. The circuit of claim 1, wherein the CC-CV current regulator comprises:

a current sense device that is arranged to sense the current of the charging signal;

a voltage sense integrator that is arranged to provide a first voltage in response to a voltage of the charging signal and the sensed current of the charging signal; and a current source that is arranged to control the current of the charging signal in response to the first voltage.

5. The circuit of claim 4, wherein the CC-CV current regulator further comprises a second voltage divider that is arranged to provide the control signal to the voltage regulator in response to a combination of a portion of the voltage of the charging signal and a signal that is based on the current of the charging signal.

6. The circuit of claim 5, wherein a ratio of a first resistor and a second resistor of a first voltage divider is substantially equal to a ratio of a first resistor and a second resistor of the second voltage divider.

7. The circuit of claim 4, wherein the current sense device further comprises a current sense resistor, and wherein the current source further comprises a voltage-controlled current source.

8. The circuit of claim 7, wherein an output of the voltage-controlled current source is determined based, in part, on a temperature dependent coefficient.

9. The circuit of claim 4, wherein the current source further comprises a voltage-controlled current source, a current mirror and a transistor, and wherein the voltage sense integrator further comprises a slow-response, transconductance amplifier and a third voltage divider.

10. The circuit of claim 9, wherein a ratio of a first resistor and a second resistor of a first voltage divider of the LDO control loop is substantially equal to a ratio of a first resistor and a sum of a second resistor and a third resistor of the third voltage divider.

11. The circuit of claim 7, wherein the voltage controlled current source is externally programmable for adjustment of the current of the charging signal.

12. The circuit of claim 9, further comprising a capacitor coupled between an output of the slow-response, transconductance amplifier and a ground node for charging current smoothness and stability.

13. The circuit of claim 9, wherein a predetermined reference voltage is coupled to an input of the slow-response, transconductance amplifier.

14. The circuit of claim 1, wherein the power source comprises at least one of a AC/DC adapter, a DC/DC adapter, a Power-over-Ethernet source, and a USB port.

15. The circuit of claim 1, wherein the load comprises at least one of a cellular phone, a personal digital assistant, a laptop computer, and a handheld data collection device.

16. A circuit for charging a battery and providing a supply voltage to a load, comprising:

a low-drop-out (LDO) regulator that is arranged to couple to a power source, the LDO regulator comprising:

a power pass device that is coupled to the power source and the load; and an LDO control loop that is coupled to the power pass device; and a constant current, constant voltage (CC-CV) current regulator that is coupled to the LDO regulator, the CC-CV current regulator comprising:

a current sense device that is coupled to the power pass device of the LDO regulator;

a voltage sense integrator that is coupled to the battery and the current sense device; and a current source that is coupled to the voltage sense integrator and the LDO control loop of the LDO regulator, wherein the LDO voltage regulator and the CC-CV current regulator are arranged such that the supply voltage to the load and a charging current to the battery are simultaneously provided during a constant current mode, and wherein the supply voltage to the load and the charging current to the battery are provided on separate signals.

17. The circuit of claim 16, wherein the CC-CV current regulator is arranged to reduce the charging current to the battery based, in part, on a charging status of the battery, and wherein the LDO regulator is arranged to maintain the supply voltage substantially constant.

18. A constant current, constant voltage (CC-CV) current regulator, comprising:

a current sense device that is arranged to sense a load current;

a voltage sense integrator that is arranged to provide a first voltage in response to a battery charge voltage and the sensed load current;

a current source that is arranged to provide a battery charging current to a battery in response to the first voltage; and a voltage divider that is arranged provide a control voltage to at least an input node of a voltage regulator in response to a combination of a portion of the battery charge voltage and a voltage to the load that is based, in part, on the battery charging current, wherein the voltage divider comprises a resistor that couples the input node of the voltage regulator to the battery, wherein the CC-CV current regulator is arranged such that the charging current to the battery, during the constant current mode, can be provided while the voltage regulator is providing a regulated voltage to the load.

19. The circuit of claim 18, wherein the current sense device comprises a current sense resistor, and wherein the current source further comprises a voltage-controlled current source.

20. The circuit of claim 18, wherein the current source comprises a voltage-controlled current source, a current mirror and a transistor, and wherein the voltage sense integrator comprises a slow-response, transconductance amplifier.

21. The circuit of claim 18, wherein the CC-CV current regulator is arranged to reduce the battery charging-current based, in part, on a charging status of the battery.

22. A method for charging a battery and providing a supply voltage to a load, comprising:

receiving an input signal from a power source;

providing a regulated output signal to the load and a regulated charging signal to the battery, wherein the regulated output signal and the regulated charging signal are simultaneously provided during a constant current mode;

providing a control signal based, at least in part, on the regulated output signal and the control signal, wherein the control signal is determined by:

providing a first signal based on sensing a current of the regulated output signal;

providing a second signal based on sensing a voltage of the regulated charging signal; and combining the first signal and the second signal; and controlling the regulated signal based on the control signal and based on a separate feedback signal wherein the feedback signal is based at least in part on the regulated signal.

23. The method of claim 22, further comprising:

providing a current of the regulated charging signal at a substantially constant value during a constant current mode;

reducing the current of the regulated charging signal based on a battery charging status and maintaining a voltage of the regulated output signal at a substantially constant value during a constant voltage mode; and maintaining the current of the regulated output signal at a substantially constant value during the constant current mode and during the constant voltage mode.

24. A circuit for charging a battery and providing a supply voltage to a load, comprising:

a means for regulating an input power signal to provide a regulated output signal to a load;

a means for providing a charging signal to a battery;

a means for sensing a current of the regulated output signal;

a means for amplifying the sensed current of the regulated output signal to provide a first control voltage;

a means for sensing a voltage of the charging signal;

a means for amplifying the sensed voltage of the charging signal to provide a second control voltage;

a means for combining the first control voltage and the second control voltage to provide a third control voltage;

a means for controlling the regulated output signal based, in part, on the third control voltage and a separate feedback signal, wherein the feedback signal is based, at least in part, on the regulated output signal; and a means for reducing the current of the charging signal based, in part, on a charging status of the battery, wherein the means for regulating the input power signal and the means for providing the charging signal are arranged such that the regulated output signal and the charging signal are simultaneously provided during a constant current mode, and wherein the regulated output signal and the charging signal are separate signals.

* * * * *

UNITED STATES PATENT AND TRADEMARK OFFICE

CERTIFICATE OF CORRECTION

PATENT NO. : 7,459,886 B1
APPLICATION NO. : 10/850943
DATED : December 2, 2008
INVENTOR(S) : Vladislav Potanin et al.

It is certified that error appears in the above-identified patent and that said Letters Patent is hereby corrected as shown below:

In column 2, line 16, after “illustrates” insert -- a --.

In column 2, line 23, before “104” delete “device”.

In column 3, line 22, delete “VrN” and insert -- $V_{IN}$ --, therefor.

In column 3, line 28, delete “feed back” and insert -- feedback --, therefor.

In column 4, line 42, delete “I242,” and insert -- $I_{242}$, --, therefor.

In column 6, line 8, after “where” delete “I373” and insert -- $I_{373}$ --, therefor.

In column 6, line 38, delete “$C_3$,” and insert -- $C_{31}$ --, therefor.

In column 7, line 28, in Claim 1, before “voltage” delete “a”.

In column 8, line 11, in Claim 11, delete “voltage controlled” and insert -- voltage-controlled --, therefor.

In column 8, line 66, in Claim 18, after “arranged” insert -- a --.

In column 9, line 38, in Claim 22, after “signal” insert -- , --.

In column 9, line 39, in Claim 22, after “based” insert -- , --.

UNITED STATES PATENT AND TRADEMARK OFFICE

CERTIFICATE OF CORRECTION

PATENT NO. : 7,459,886 B1
APPLICATION NO. : 10/850943
DATED : December 2, 2008
INVENTOR(S) : Vladislav Potanin et al.

It is certified that error appears in the above-identified patent and that said Letters Patent is hereby corrected as shown below:

In column 9, line 39, in Claim 22, after "part" insert -- , --.

Signed and Sealed this

Twenty-fourth Day of February, 2009

JOHN DOLL
*Acting Director of the United States Patent and Trademark Office*